United States Patent [19]

Boyle

[11] Patent Number: 5,185,080
[45] Date of Patent: Feb. 9, 1993

[54] PROCESS FOR THE ON-SITE REMOVAL OF NITRATES FROM WASTEWATER

[76] Inventor: Gregory Boyle, 113 Winesap Rd., Cherry Hill, N.J. 08003

[21] Appl. No.: 809,101

[22] Filed: Dec. 11, 1991

Related U.S. Application Data

[63] Continuation of Ser. No. 532,790, Jun. 4, 1990, abandoned.

[51] Int. Cl.[5] ............................................. C02F 3/34
[52] U.S. Cl. .................................. 210/611; 210/612; 210/747; 210/903
[58] Field of Search ............... 210/610, 611, 631, 747, 210/903, 605, 612

[56] References Cited

U.S. PATENT DOCUMENTS

| | | | |
|---|---|---|---|
| 4,401,569 | 8/1983 | Jhaveri et al. | 210/747 |
| 4,576,717 | 3/1986 | Collin et al. | 210/747 |
| 4,683,064 | 7/1987 | Hallberg et al. | 210/747 |
| 4,970,000 | 11/1990 | Eppler et al. | 210/611 |
| 5,061,368 | 10/1991 | Tada et al. | 210/903 |
| 5,078,884 | 1/1992 | Mulder | 210/611 |

OTHER PUBLICATIONS

*Handbook of Biological Wastewater Treatment*, Henry H. Benjes, Jr., Garland STPM Press, 1980, pp. 64–67.
*New Jersey Pinelands Comprehensive Management Plan* State of New Jersey, Adopted Nov. 21, 1980, pp. 51–53.
*Water Supply and Pollution Control*, Viessman & Hammer, Harper & Row, 4th Edition, pp. 695–710.
*Microbiology*, Pelczar & Reid, McGraw-Hill, pp. 182–702–704.
Material Safety Data Sheet, Dec. 22, 1988, Sybron Chemicals, Inc. pp. 1–3, and 1.
*Nature and Properties of SOILS*, Nyle C. Brady, 8th Ed., Macmillan Publ., Chapters 10:12 and 10:13.
*U.S. Water News*, Dec. 1989, vol. 6, No. 6, U.S. Water News, Inc. and Freshwater Foundation, "California orders 34,000 to abandon their septic tanks; Large-scale sewer technology applied to household use".
*Water Engineering & Management*, Nov. 1989, "Legislature addresses nitrate leaching".
Evaluation of On-Site Waste Disposal System for Nitrogen Reduction, Richard Piluk & Oliver J. Hao, *Journal of Education Engineering*, vol. 115, No. 4, Aug. 1989, ASCE Environmentally Efficient Modern On-Site Wastewater Technology, Rein Laak Ph.D., P.E., Ruck Systems.
Nitrogen Removal Systems for On-Site Wastewater Treatment. Arthur J. Gold, Bonnie E. Lamb, George W. Loomis, & Charles G. McKiel, *University of Rhode Island*, Journal Paper No. 2515.

*Primary Examiner*—Thomas Wyse
*Attorney, Agent, or Firm*—Eugene Chovanes

[57] ABSTRACT

A system for the treatment of nitrate-containing wastewater from home or commercial, not municipal, sources is described in which the wastewater is contacted underground by denitrifying bacteria introduced to the treatment zone periodically; the treatment zone being maintained at or above the temperature at which the bacteria are active on a year-round basis by the ground temperature.

8 Claims, 1 Drawing Sheet

PROCESS FOR THE ON-SITE REMOVAL OF NITRATES FROM WASTEWATER

This application is a continuation of application Ser. No. 07/532,790, filed Jun. 4, 1990, abandoned.

FIELD OF THE INVENTION

The present invention relates to the treatment of wastewater from home wastewater streams or other small individual sources to convert nitrates to nitrogen gas, thus reducing the amount of nitrate introduced to the acquifer to avoid eutrophication and the introduction of levels of nitrate in drinking water detrimental to human health.

BACKGROUND OF THE INVENTION

While nitrogen is of primary importance in the renovation of sewage, excessive concentrations of nitrogen compounds in groundwater are a public health hazard and also contribute to the eutrophication of surface water. The presence of nitrite ($NO_2-$) and, indirectly, nitrate ($NO_3-$), in drinking water may lead to methemoglobinemia which can impair oxygen transport in the blood, particularly in infants where gastrointestinal upsets can encourage reduction of nitrite to nitrate. The hazards of these materials and their precursors, the nitrosamines, in the soil and acquifer are explained in detail in the *New Jersey Pinelands, Comprehensive Management Plan*, New Jersey Pinelands Protection Act, 1979, adopted Nov. 21, 1980, pages 51-53, which is incorporated herein by reference. Many other states and the federal government have adopted standards for limiting the amounts of nitrates which may be released to the acquifer.

THE PRIOR ART

The treatment of sewage in order to renovate it to an acceptable condition for release to the acquifer is, of course, very old and well-known. Such treatments typically involve primary and secondary treatments in which the sewage is first allowed to settle to remove solids and is then aerated and allowed to settle again before the relatively renovated effluent is released to the acquifer. A typical process of this type is described in Jenks, U.S. Pat. No. 2,694,043 issued Nov. 9, 1954.

The effluent from the second stage of typical sewage treatment processes of the prior art contains substantial concentrations of environmentally deleterious nitrates which are also a human health hazard if they find their way into drinking water. Therefore, third stage denitrification processes have been developed and widely used. Typical are those described in Mandt U.S. Pat. No. 4,290,884 issued Sep. 22, 1981.

Savage, U.S. Pat. Nos. 3,709,364 issued Jan. 9, 1973 and 4,179,374 issued Dec. 18, 1979 describe the denitrification of treated sewage by the use of bacteria retained on filters for this purpose.

Menzel et al, U.S. Pat. No. 4,756,831 issued Jul. 12, 1988, describes a process for removing nitrate from surface and groundwater, in particular, drinking water, by means of biological denitrification, in which the nitrates contained in the water are reduced to gaseous nitrogen in a reactor by means of biocatalysts having immobilized cells trapped in a gel or polymer. The micrococcus denitrification used requires for its metabolism added hydrogen and carbon that is present in the water in the form of dissolved carbon dioxide. Using a biocatalyst of immobilized cells and of the bacterial strain disclosed, expensive post-purification is said to be unnecessary because of increased bacterial count in the pure water outlet, and no undesirable by-products are formed.

From the foregoing, it is apparent that the problems caused by the release of nitrate-containing wastewater to the acquifer have long been recognized and that a variety of processes are known in the art for reducing the nitrate content of such wastewaters. However, such processes have heretofore been applicable only to large scale operations such as industrial or commercial wastewater treatment facilities and, particularly, to municipal sewage treatment plants. Moreover, previously proposed biological denitrification processes have had serious drawbacks. Among these are the cost of the hydrogen and carbon nutrients required by the denitrification bacteria; methanol, a relatively costly chemical having been a recommended source. Another serious drawback to previously proposed bacterial denitrification processes has been the fact that the bacteria are active only above about 50° F. which precludes use of these processes in areas where the ambient temperature falls below this level, at least for some months of the year.

Still another drawback of the previously proposed denitrification systems is that they have not been applicable to the innumerable small sources of nitrate-containing wastewater such as individual small industrial plants and businesses not served by municipal wastewater management systems and, in particular, to home wastewater systems. Many states and the federal government have come to realize that individual home wastewater systems, due to their large numbers, are as serious, or more serious sources of nitrate-containing wastewater than the large agricultural fertilizing and municipal sewage systems. For example, the California Water Resources Control Board has issued an order directing homeowners to abandon existing septic tanks by the end of 1996 and to preclude the installation of septic tanks in new homes after 1991. This order was based on evidence of nitrate contamination in private drinking water wells which was found to be due to household septic tanks. However, to date, very little attention has been given to the problem of treating the effluent from septic tanks or other household wastewater streams in order to make their continued use acceptable. One such proposal has been made in New Mexico where a small rotating biological contactor unit has been tested for the secondary treatment of sewage from mobile homes after passing the sewage through a septic tank. The test unit consisted of a series of rotating disks partially immersed in a tank about four feet long and a foot deep. The New Mexico Water Resources Institute considers this type of research important since the principal cause of the state's groundwater contamination is the household septic tanks in New Mexico. While this may be a possible solution to the problem of nitrate-containing wastewater from household systems in warm climates, it does not solve the problem in areas where the ambient temperature falls below the level at which the denitrifying bacteria are active.

Therefore, the problem remains to provide a reliable, low-cost system, operable the year-round, to denitrify nitrogen-containing wastes from home wastewater streams and other small individual sources.

SUMMARY OF THE PRESENT INVENTION

The present invention is based upon the novel concept of employing the temperature of the earth and, more specifically, the ground temperature adjacent to the discharge of home or other small wastewater streams to provide the necessary activation temperature for known denitrifying bacteria in a system receiving the effluent from home or commercial wastewater streams.

More specifically, the invention relies upon the fact that the average temperature of the wastewater effluent from homes in temperate zones of the earth averages about 58° F. This in conjunction with the normal year-round ground temperature in all but the coldest climatic zones provides the necessary temperature to maintain the activity of the known and available denitrifying bacteria. The invention, therefore, resides in the provision of an underground bacterial denitrification system adjacent to and receiving the effluent from home or other small wastewater streams.

Another primary aspect of the invention is the provision of bacteria on a periodic, especially daily, basis in order to provide excess bacteria, even double or triple the amount normally or hypothetically present in a commercial or municipal reactor or filter. The purpose of providing excess bacteria in this way is to make it possible to accommodate fluctuation in the ammonia content of the waste-water being treated. The ammonia content of such wastewater streams varies geographically and seasonally and while averaging about 40 mg/l around the country, may range as high as 60 mg/l or more.

Inasmuch as only the arctic and antarctic zones have ground temperatures below the approximately 50° F. level at which known denitrifying bacteria are active, and since these areas are only sparsely inhabited by humans, if at all, the system of the invention is applicable for virtually all areas of significant levels of human habitation.

DETAILED DESCRIPTION OF THE INVENTION

As noted above, the invention resides in providing a complete underground bacterial denitrification treatment system to substantially reduce to acceptable levels, the nitrogen content of the effluent from home or other small wastewater streams. The temperature of the denitrification zone of the system and the wastewater being treated is maintained at or above the temperature (48–50° F.) at which the bacteria are active. The treatment temperature is influenced by a number of factors, but most importantly by the temperature of the household sewage effluent and the adjacent ground temperature. Typical household sewage effluent temperatures measured in Rancocas Township in New Jersey ranged from a low of 12° C. in January, February and March, 1989, up through 14° C. in April, 17° C. in May, 20° C. to 21° C. in June, July and August, dropping to 19° C. in September and October, and finally to 16° C. in November. The average of these effluent temperatures was 16.5° C. or 58.8° F. It has been found that such effluent temperatures average about 58° F. year-round throughout the United States.

It should be noted that the average ground temperature is normally higher than the average wastewater temperature, and that for this reason the wastewater is usually warmed by the ground around the treatment zone. As is known, the higher the temperature, the more active the bacteria.

The federal government has allowed each of the states to establish a minimum top of tank or ground cover for on-sight septic systems or other disposal methods. The reason is the severity of winter in different states. The terminology "frostline" is used for determining the required depth for each state. As an example, the State of Florida may have a minimum ground cover to top of tank at no less than one foot. In contrast, the State of Maine may require four feet to top of tank due to the ground freezing that deeply.

A typical process apparatus of the present invention has a side wall depth (SWD) of five feet. Depending on each state's requirements, minimum cover above the on-site disposal system may be derived. Florida's requirement of one foot cover plus five feet SWD average would place the the ground temperature range between January 71° F. to a July 86° F. In Maine, the range would be from January 68° F. to a September 79° F. The deeper the tank, the warmer the temperature.

Water temperature ranges below about 50° F. would inhibit the denitrifying bacteria activity and also the bacteria in the aeration chamber which reduce BOD, suspended solids, COD, and nitrification. Low water temperature of any aerobic wastewater treatment plant would severly hinder the pollutant removal capabilities of that process. In areas such as parts of Alaska, for example, the frostline may be too deep for year-round applicability of the process.

Theoretical Basis for Nitrogen Removal

The wastewater treatment process of the invention includes an aerobic microbial process following primary sedimentation. Prior to application of the inventive process, aerobic bacteria present in the household waste stream are activated by atmospheric air being injected into a chamber designed for mixing oxygen with a mass of bacteria already present in the chamber and controlled by a waste sludge pump. The injection of oxygen establishes the predominate aerobic strains of bacteria. Food for the aerobic bacteria is supplied by the waste stream from the household. This process has been in existence and continual use for 35 years and is still the choice of design because of the process' high quality pollutant removal capabilities. The activated sludge sewage treatment process has many types available; e.g., conventional, plug flow, contact stabilization, extended aeration, unox, and the like. The multiproven designs are utilized to fit the various waste streams to be treated and the final product (effluent) required along with land area and financial consideration. This application is for an extended aeration activated sludge process.

Domestic or commercial untreated wastewater, not industrial, has basic characteristics that remain within constant parameters across the United States. They are: biological oxygen demand ($BOD_5$) 240 mg/l, ammonia 40 mg/l, suspended solids 240 mg/l and nitrate nitrogen less than 1 mg/l. In the nitrogen cycle of raw sewage, nitrite is very unstable in the chemical equilibrium and tends to convert to ammonia or nitrate, depending on the environment present, but in all cases nitrite is miniscule in concentration. An extended aeration process (a long detention time in the aeration chamber) is desirable due to its ability to convert ammonia nitrogen to nitrate nitrogen. The accelerated conversion is due to the mass of bacteria in the aeration chamber which moves or converts the ammonia to nitrate, as within the normal nitrogen cycle. Such a process for extended aeration of wastewater for the low ammonia concentrations and the high nitrate levels, is described in *Handbook of Biological Wastewater Treatment* by Henry H. Benjes, Jr., Garland STPM Press, 1980.

The process of the invention preferably uses a primary sedimentation/Imhoff tank, an aeration chamber, secondary settler and denitrification chambers. Primary settlers are designed to remove 90-95% settleable solids, 25-35% BOD and 40-60% suspended solids. The preferred treatment system has an overdesigned primary settler to achieve the above removals as minimal efficiencies. The preferred aeration tank utilizes a fractional horsepower electrical motor to drive a below-the-water level aspirator for atmospheric air injection. The mass of solids containing bacteria present in this chamber attack the wastewater leaving the primary tank, this material enters the aeration tank, and the solids act as a food source for the bacteria living in an aerobic environment.

In the aeration tank the atmospheric air being injected will strip to the atmosphere some of the ammonia present, but not totally. The balance of the ammonia is converted to nitrate nitrogen by the bacteria as shown in the nitrogen control No. 1007, U.S. Environmental Protection Agency (E.P.A.) *Technology Transfer*, October, 1975. Ammonia through biological oxidation is driven to nitrite ($NO_2$) nitrogen, some of which is atmospherically stripped, the balance through nitrification to nitrate, as in the well-known nitrogen cycle. Nitrification occurs in the aeration chamber of the process. The mass of solids and accompanying bacteria are hydraulically moved to the secondary settler. The settler is quiescent by design, which allows the mass of solids to flock. Since they are heavier than the water they displace, they settle downward to the sloping floor of this tank. The sloping floor allows the solids to be directed to the aeration chamber where the hydraulic roll of the aeration tank picks up the solids and brings them back into suspension. The clear liquid leaves the secondary settler with a high concentration of nitrate nitrogen 14± mg/l and enters a pair of denitrification chambers.

In the denitrification chamber, pre-measured quantities of a composite material, containing bacteria and a source of carbon as food, is introduced daily or even bi-daily to the treated wastewater. The bacteria are heterotrophic, laboratory cultured and packaged, as a loose particulate material, capsules, pellets, tablets or other shaped forms. The bacteria *Pseudomonas*, normally present in the ground, is prevalent in this material. The *Pseudomonas* microorganism has the capability of transforming nitrates to nitrogen gas. The technology of this conversion is well known.

The preferred pre-measured microbial tablet includes a carbon supply (source) for biological synthesis. The need for a carbon source is discussed in *Handbook of Biological Wastewater Treatment* by Henry H. Benjes, Jr., Garland STPM Press, 1980.

Denitrification using suspended or fixed growth systems is discussed in the foregoing reference. In both systems, nitrogen-reducing bacteria are propagated in an anoxic chamber. An anoxic chamber, which is the preferred environment or treatment zone of the invention, provides the ideal environment for the propagation and denitrifying action of the bacteria. It should be understood, however, that in this context "anoxic" does not mean absolutely devoid of oxygen, but only that the amount of dissolved oxygen in the wastewater is very low. The action of the secondary settler creates the substantially anoxic state of the wastewater entering the treatment zone. Detention time in the treatment zone varies, but about four hours is generally satisfactory for denitrification.

The system of the invention is operable with a wide variety of apparatus provided that it is buried in the ground to a depth sufficient to maintain the temperature of the bacteria above the 48-50° F. temperatures below which they become inactive.

DESCRIPTION OF THE DRAWING

In FIG. 1, a primary sedimentation tank 20 is shown connected to a conduit from a home carrying sewage waste-water to be treated. After initial settling in the tank 20, the wastewater flows into an aeration tank 21 and then into a secondary settler 22. Such aeration and settling tanks are known in home wastewater systems. Means, for introducing the treatment material 27, not shown, are included between tanks 22 and 23, but the material may also be introduced directly to tank 23.

Figure 1:
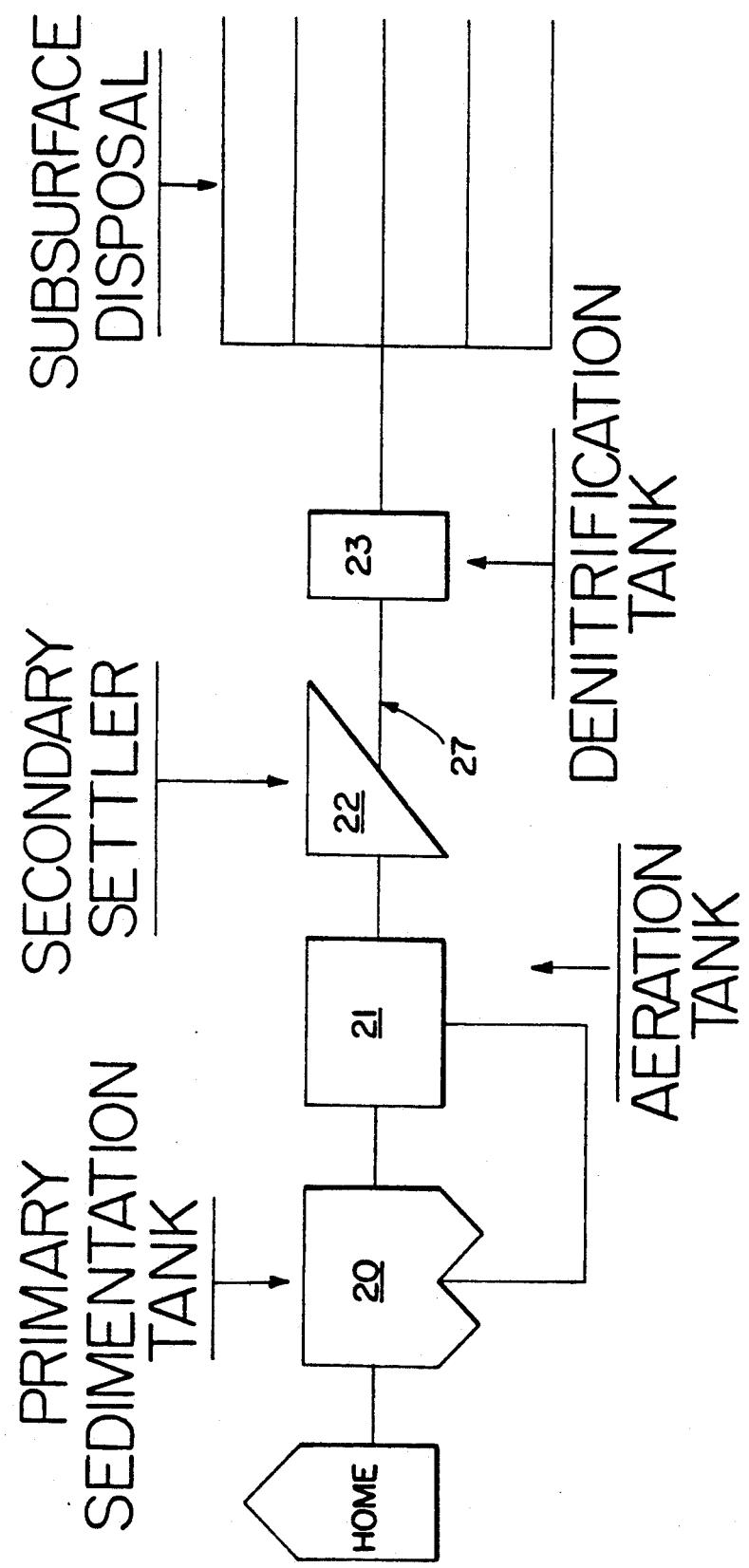
FIG. 1 is a schematic representation of a system of the invention, including the underground bacterial treatment zone.

The wastewater from this home system, which contains undesirable concentrations of nitrate, is then conducted into the underground bacterial denitrification tank or zone 23 where it is contacted by denitrifying bacteria at a temperature at which they are active, i.e., above about 48-50° F. The denitrifying bacteria are supplied to the tank or zone 23 in measured dosages, usually on a daily basis, in any suitable form. The bacteria are mixed with a source of carbon in known necessary proportions for their nutrient support. Suitable proportions are from about 0.5 to 12 parts of bacteria to 1 part of carbon source by weight; preferably in a ratio of about 1 to 10 parts, and most preferably 3 to 10 parts, of bacteria to carbon nutrient. The mixed bacteria-carbon nutrient material may be introduced in particulate "sawdust" form in soluble plastic bags, for example, or in shaped forms such as tablets or pellets.

Treated denitrified wastewater leaving the denitrification tank or zone 23 enters a distribution box or zone (not shown) and exits therefrom to a subsurface disposal field.

Nitrogen Removal Efficiency of Operating Systems

The preferred bacteria to be utilized in the disposal process of the invention are the same as those used at the Waterford, New Jersey Township Municipal Utilities Authority above-ground public sewer treatment plant. The wastewater treated at the Waterford plant is domestic wastewater with no industrial discharge, characteristic of that which would flow from a home where this treatment process would be used.

In Waterford Township test results, it has been found that the bacteria performed to unexpected levels of nitrate nitrogen reduction. As the water temperature at the Waterford plant dropped, so also did the bacteria activity and their ability to convert nitrate to nitrogen gas. Contrary to the Waterford plant, which has a large area exposed to the ambient air temperature, wastewater from a single family home averages 58° F. year-round. This temperature range is very conducive to the bacterial activity proposed for denitrification.

Nitrate Concentration Meeting the Standard

The wastewater flow from a single family home changes very little throughout the year. In the Waterford plant, on the contrary, the wastewater temperature varied markedly from summer to winter, increasing in the spring and summer months with a descent in the fall to the average winter temperature range. When evaluating the Waterford data for seasonal temperature ranges and low levels in the plant effluent, a correlation was established which demonstrates the process of the invention would achieve less than the mandated 2.0 mg/l nitrate content due to the higher temperature range prevailing in the on-site process of the invention.

The ability to meet the standard 2 mg/l over a long time period is dependent upon the treatment plant's capability of receiving bacteria routinely, preferably on a daily basis.

The process of the invention would be utilized at homes where deed restrictions are incorporated to reflect the local governmental body as a co-permittee. The local government would charge the homeowner a yearly fee to cover the expenses of refurbishing the bacterial material and for septic sludge removal every three years.

The government co-permittee within the deed restriction brings into play the federal and state clean water acts, thereby legitimizing the deed restrictions for the duration of use and the local government's obligation to maintain the treatment plant on the homeowner's grounds.

Maintenance of On-Site Wastewater Treatment Plant

The proposed treatment plant requires maintenance and can only be installed where a governmental body accepts the responsibility of a co-permittee as established by the state regulatory body. Operation and maintenance of the on-site plant will be the responsibility of the local governmental body, via the co-permittee process.

Monitoring Program

The design preferably incorporates a sampling port after the denitrification chamber. The port is located at the outfall of the treatment plant. The distribution box could be utilized as a sampling point as could, of course, monitoring wells within or downgrade from the subsurface disposal field.

Exceedance of Standard Home Wastewater Systems

The preferred treatment plant is a gravity flow-through plant with four compartments:
1) primary sedimentation
2) aeration
3) secondary settling, and
4) denitrification.

The primary settling/Imhoff tank with its unique ability to separate settleable solids from the flow stream by itself exceeds the removal capabilities of the standard septic system. Primary settlers are designed to remove 90-95% settleable solids, 25-30% BOD and 40-60% suspended solids. As noted above, a preferred treatment plant has an overdesigned primary settler and the above removals are minimal efficiencies. The additional tankage size can only remove more solids. Additionally, under the co-permittee process, the treatment plant normally would be guaranteed to be pumped out every three years by the local government.

The preferred treatment plant is designed for daily wastewater flows of 600 gallons per day, which is more than an average household wastewater generation. Across the United States, the average water use per capita is 80 gallons per day. The amount of treating material, e.g., tablet weight or "sawdust" weight, is one (1) ounce which includes the bacteria and carbon at a 1-to-10 ratio, respectively. The one ounce weight is sufficient to treat the 600 gallon per day flow rate.

In tabletizing, the bacteria and carbon preferably may be pressed together with a non-soluble binder to form a tablet diameter of approximately two inches and 5/16" thick.

In the "sawdust" consistency, the blended bacteria and carbon may be sealed in a water soluble bag which would dissolve when placed in water. The bag is similar to a plastic sandwich bag. The material weight for the tablet or bag form is the same. The weight of one ounce combined is sufficient to treat nitrogen to a 48° F. low level. Higher temperatures have a more positive effect on the denitrifying bacteria and a lesser weight would be required.

The bacterial treatment material may contain any known dentrifying bacteria and any source of nutrient capable of maintaining the activity of the bacteria. The proportions of bacteria to nutrient matter depend upon the requirements of the particular bacteria employed; in general, proportions of 0.5 to 12 and, preferably, about 1-to-10 parts of bacteria to nutrient are sufficient.

An especially preferred bacterial nutrient material has the following composition:

|  | % by Weight |
| --- | --- |
| Disodium phosphate | 5-10 |
| Monosodium phosphate | 2-5 |
| Ammonium phosphate | 2-5 |
| Milk or milk By-Products | 80-90 |

A suitable composition of this type is available commercially from Sybron Chemicals, Inc., Salem Va. Any other material providing 80-90% carbon by weight can be employed.

All of the chemical ingredients suggested above are on the U.S. Environmental Protection Agency (EPA) TSCA inventory.

Suitable bacteria include *Serratia, Achromobacter, Pseudomonas, Agilis, Thiobacillus* and *Micrococcus*.

An especially suitable bacterial product designated BI-Chem DC 2003 MS is available from Sybron Chemicals of Salem, Va., as a free-flowing, tan-brown powder having a yeastlike odor, which has a pH of 7.8-8.0, a bulk density of 0.66-0.77 gm/cm$^3$ and which is soluble in water and contains viable denitrifying bacteria. The bacteria in this product are normally found in the soil and are isolated from soil and cultured. For this reason, the bacteria are normal to the environment and cannot constitute an environmental hazard.

What I claim is:

1. An underground process for the treatment of wastewater from home or commercial sources in which said waste-water is subjected to primary settling, aeration and secondary settling treatments underground to product nitrate-containing wastewater, which further comprises:
   introducing said nitrate-containing wastewater from said underground secondary settling treatment to an underground treatment chamber and further treating said nitrate-containing wastewater by the periodic addition to said chamber of a material comprising denitrifying bacteria and a source of carbon to support said bacteria, said treatment chamber being maintained year-round by the temperature of the surrounding ground at a temperature at which said bacteria are active, whereby said bacteria convert the nitrate in said wastewater to nitrogen gas.

2. A process of claim 1 in which the treatment chamber is maintained at a temperature above about 50° F. by the surrounding ground.

3. A process of claim 2 in which said treatment material is introduced to said treatment chamber at least once daily.

4. A process of claim 3 in which the treatment material comprises denitrifying bacteria and a carbon source for the support of said bacteria in proportions of about 0.5 to 12 parts of bacteria to 1 part carbon by weight.

5. A process of claim 4 in which the treatment material comprises denitrifying bacteria and a carbon source in proportions of about 1 to 10 parts of bacteria to 1 part of carbon by weight.

6. A process of claim 5 in which the denitrifying bacteria is primarily *Pseudomonus* and the carbon source is milk or milk by-products.

7. The process of claim 6 in which the material is in loose particulate form.

8. The process of claim 7 in which the material is pelletized.

* * * * *